United States Patent [19]

Dziedzic et al.

[11] 3,938,923

[45] Feb. 17, 1976

[54] APPARATUS AND METHOD FOR FORMING A SEALED OUTER RING FOR CERAMIC REGENERATOR

[75] Inventors: Chester J. Dziedzic, Dushore; Richard N. Kleiner, Towanda; Joseph J. Cleveland, Wysox, all of Pa.

[73] Assignee: GTE Sylvania Incorporated, Stamford, Conn.

[22] Filed: May 2, 1974

[21] Appl. No.: 466,394

[52] U.S. Cl. .................................... 425/127

[51] Int. Cl.[2] .................... B29C 27/14; B29C 30/00

[58] Field of Search ........ 425/85, 117, 127; 264/87; 117/119; 118/50, 408, 406, 407, 52; 427/243, 282, 300

[56] References Cited

UNITED STATES PATENTS

| | | | |
|---|---|---|---|
| 3,537,424 | 11/1970 | Sadler | 118/52 |
| 3,712,825 | 12/1970 | Yocum | 427/282 |
| 3,839,521 | 10/1974 | Robinson | 264/87 |

FOREIGN PATENTS OR APPLICATIONS

| | | | |
|---|---|---|---|
| 110,640 | 11/1917 | United Kingdom | 264/87 |

*Primary Examiner*—Francis S. Husar
*Assistant Examiner*—Robert J. Charvat
*Attorney, Agent, or Firm*—Norman J. O'Malley; John C. Fox; Donald R. Castle

[57] ABSTRACT

In the formation of cylindrically shaped heat regenerators from ceramic honeycomb structures for use in gas turbine engines, a gas-impervious seal of the peripheral honeycomb cells and a high strength outer ring are formed simultaneously in an apparatus which provides for surrounding the outer wall of the honeycomb structure with a castable ceramic composition suitable for forming the outer ring, contacting a peripheral area of the upper surface of the honeycomb structure defining a predetermined number of peripheral cell openings with a (different) ceramic slurry composition, evacuating the honeycomb cells whose openings are contacted with the slurry composition through corresponding openings in the lower surface of the honeycomb structure in order to promote flow of the slurry into the evacuated cells, thereby forming a gas impervious seal of these peripheral cells, while simultaneously vibrating the honeycomb structure and castable composition in order to promote flow and intimate contact of the castable composition with the outer wall of the structure, thereby to form an outer adherent layer of the castable composition on the wall of the structure. After drying, the honeycomb structure with the filled peripheral cells and the outer adherent layer of ceramic may be fired in the conventional manner to convert the structure to a unified ceramic regenerator having a sealed outer ring.

6 Claims, 3 Drawing Figures

APPARATUS AND METHOD FOR FORMING A SEALED OUTER RING FOR CERAMIC REGENERATOR

BACKGROUND OF THE INVENTION

This invention relates to ceramic forming techniques and more particularly relates to an apparatus and method for forming a sealed outer ring for a ceramic honeycomb structure.

Due to the inherent fragility of ceramic honeycomb structures and to the fact that they must be driven externally in many cases, (for example, a cylindrical regenerator for a gas turbine engine must be continuously rotated through hot and cold gas streams), the need arises for an outer ring of higher strength than the honeycomb structure. Several approaches to this problem have been taken in the prior art, including for example forming the outer ring as one or more separate parts and gluing these parts to the honeycomb structure with special glues or other compositions as exemplified by U.S. Pat. No. 3,251,403 or placing stressed metal bands around the outside of the structure as exemplified by U.S. Pat. No. 3,081,822. In addition to the strength requirement, the outermost or peripheral cells of the honeycomb structure must be closed in some manner to form an effective seal while the regenerator is operating in order to prevent the leakage of gas from the desired flow path in the gas turbine engine.

While these operations have been performed separately up to the present time, it would be desirable to be able to form these rings for strength and for sealing in one unitary operation, in order to render the production process more economical and commercially feasible.

SUMMARY OF THE INVENTION

In accordance with the invention an apparatus is provided in which an outer supporting ring and an inner sealing ring for ceramic honeycomb structures are formed simultaneously. This is achieved by providing: a first reservoir for the structure and a castable ceramic composition surrounding the outer wall of the honeycomb structure; a second reservoir for a (second) ceramic slurry composition to contact a first surface of the structure defining honeycomb cell openings; means for temporarily sealing all but a predetermined number of peripheral cell openings in the first surface; and means for simultaneously evacuating the cells in order to promote flow of the slurry composition into the unsealed peripheral cells and for vibrating the structure in order to promote flow and intimate contact of the castable ceramic composition with the outer wall of the structure, thereby to seal the peripheral cells and to form an outer adherent layer of green ceramic on the wall of the structure.

While the apparatus and method of the invention are primarily useful in the formation of sealed outer rings for cylindrically shaped ceramic regenerators for use in gas turbine engines, it will be appreciated that structures having shapes other than cylindrical may also be advantageously treated in accordance with the teachings of the invention. For example ceramic recuperators having honeycomb structures and having rectangular or other cross sections may be treated in a manner analogous to the teachings of the present invention.

DETAILED DESCRIPTION OF THE INVENTION

Figure 1:
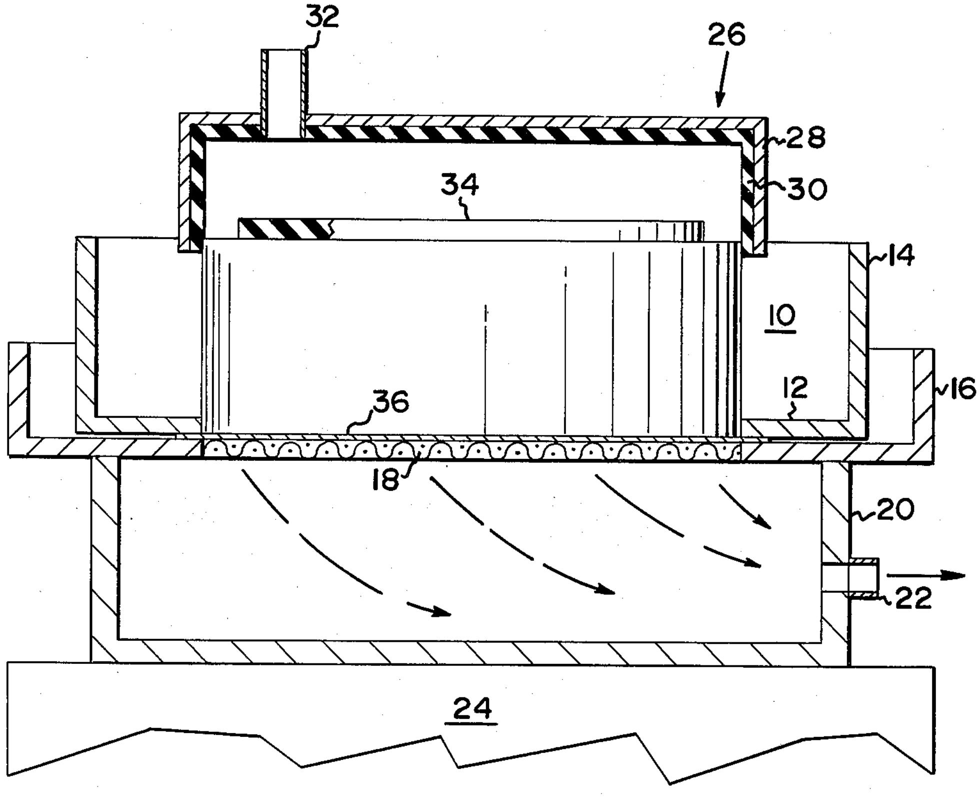
FIG. 1 is a front elevation view partly in section of one embodiment of an apparatus in accordance with the invention.

Referring now to FIG. 1, there is shown one embodiment of the apparatus of the invention in which reservoir 10 is provided for holding a castable ceramic composition which may or may not exhibit thixotropic properties. By thixotropic is meant that upon the introduction of mechanical agitation, the ceramic undergoes a marked change in viscosity. The use of such casting compositions is well understood in the art and a detailed description is unnecessary to an understanding of the invention. The castable reservoir has a bottom portion 12 which defines a circular opening whose diameter is the same as or slightly larger than the diameter of the regenerator to be processed, and also has side walls 14 of a height at least equal to the thickness or outer wall height of the regenerator. The reservoir and regenerator are set on a supporting member 16 including a perforated or wire mesh portion 18 at least equal to the diameter of the regenerator cross section. This perforated or wire mesh portion should have sufficient strength to support the castable reservoir and regenerator but should have sufficient openings to permit the free flow of air or other gas. This supporting member 16 is in turn placed upon a vacuum box 20 having an outlet 22 connected to a vacuum source not shown. This vacuum box is in turn supported upon a vibrator 24, which may be of any conventional (e.g., mechanical or ultrasonic) type known in the art. A second reservoir 26 for containing a ceramic slurry composition is comprised of an outer layer 28 for structural strength and an inner sealing layer 30 of rubber or other suitable material and contains fill spout 32 for the introduction of slurry to the reservoir. The reservoir is of the same or slightly smaller diameter than the regenerator cross section in order to provide a snug fit between the reservoir and the regenerator outer wall and to prevent leakage of slurry into the castable composition reservoir. A blocking sheet 34 is placed upon the upper flat surface of the regenerator in order to prevent contact of the slurry composition with all but a predetermined number of peripheral cell openings which are desired to be sealed and impregnated. This blocking sheet could be of rubber, plastic, or other suitable material or in the alternative the upper portions of these cells could be filled with paraffin, bees wax, or other resin or organic material which could be removed by volatilization at moderate temperatures. It will now be seen that as a vacuum is created in vacuum box 20 the peripheral cells to be sealed become evacuated through wire mesh member 18, thereby promoting the flow of ceramic slurry composition into these cells. A porous material such as filter paper or cloth is interposed as layer 36 between the regenerator and the wire mesh member 18. This material permits evacuation of the cells but substantially prevents leakage of the slurry material from the cells to be impregnated and sealed.

Figure 2:
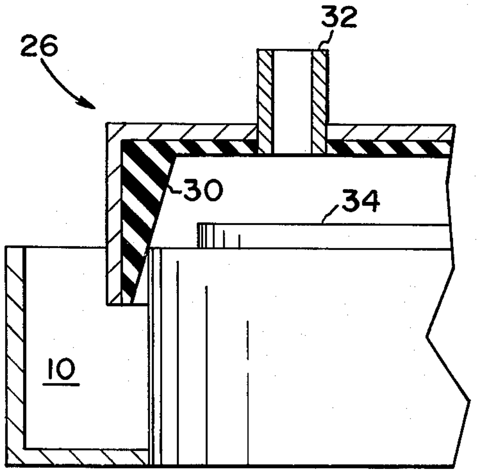
FIG. 2 is a front elevation view partly in section of a portion of an apparatus similar to that of FIG. 1, but showing a preferred construction of the sealing ring for the slurry reservoir.
Figure 3:
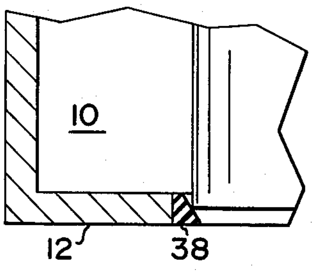
FIG. 3 is a front elevation view partly in section of a portion of an apparatus similar to that of FIG. 1, but showing a preferred construction of a sealing ring for the bottom portion of the casting reservoir.

Referring now to FIG. 2 in which common elements are numbered as in FIG. 1 there is shown an alternate construction of the sealing ring 30 for slurry reservoir 26. This sealing ring in cross section has a tapered side permitting the flow of slurry composition into the outermost peripheral cells of the honeycomb structure while also permitting the flow of castable composition to the upper extremities of the outer wall of the regenerator. In addition this construction permits accommodating a variety of different sized regenerators of circular cross section Referring now to FIG. 3 in which common elements are numbered as in FIG. 1, there is shown an alternate construction for the bottom portion 12 of castable reservoir 10 in which a sealing ring is provided around the edge of the opening defined by bottom portion 12. The construction is similar to that of FIG. 2 in that the cross section of the sealing ring is tapered to permit flow of the castable composition to the lower extremities of the regenerator wall and also to permit evacuation of the outermost peripheral cells of the regenerator in order to promote flow of slurry down into these cells. The thickness of bottom portion 12 and of sealing ring 38 could be extended so that the cross section of sealing ring 38 would be similar to that of sealing ring 30 of FIG. 2, whereby reservoir 10 could accommodate regenerators of various sizes. Alternatively, means could be provided for adjusting the size of the bottom opening.

In operation, once the combined effect of the vacuum and vibrator have caused the flow of slurry into the outer cells and the flow of castable ceramic composition around the outer wall of the regenerator, both the vacuum and the vibrator are turned off, the excess casting and slurry composition drained from the apparatus and the wet ceramic materials allowed to set. The upper portion of the apparatus can then be lifted up by the support member 16 and placed into a drying oven to remove excess moisture. Following this, the structure may be fired in the conventional manner to convert it to a unitary ceramic body including the inner honeycomb structure whose outer cells are now impregnated and sealed and the outer support ring.

For a better understanding of the present invention, together with other and further objects, advantages and capabilities thereof, reference is made to the following disclosure and appended claims in connection with the above-described drawings.

What is claimed is:

1. Apparatus for forming a gas-impervious ceramic seal within a predetermined number of the peripheral cells of a ceramic honeycomb structure having first and second opposing surfaces defining the cell openings and having an outer wall surrounding the cells, while simultaneously forming a ceramic layer on the outer wall, the apparatus comprising:

a. a first reservoir adapted to receive the structure and a castable ceramic composition, the reservoir having a bottom portion defining an opening corresponding in shape to the cross section of the structure and having an area at least equal to the area of the first surface, and having side walls of a height at least equal to the height of the outer wall of the structure;

b. first removable gas-impervious slurry-impervious contact means adapted for gas-impervious contact with a central portion of the second surface, for forming a temporary vacuum seal of the central portion cells, and leaving the peripheral cells exposed;

c. a second reservoir adapted for positioning atop the structure and having outer walls adapted for contact with the outer walls of the structure, for maintaining a ceramic slurry composition in contact with the exposed cells of the second surface;

d. second removable gas-pervious slurry-impervious contact means adapted for contact with at least the cell openings of the first surface corresponding to the exposed cell openings of the second surface;

e. vacuum means positioned below the second contact means in contact therewith, adapted for evacuating the exposed peripheral cells through the second contact means, to promote flow of slurry into the evacuated cells, thereby to at least partly impregnate and seal these cells against gas flow; and f. vibrator means positioned below the vacuum means and in contact therewith for vibrating the apparatus to promote flow of the casting and slurry compositions.

2. The apparatus of claim 1 wherein the second reservoir comprises a ring having an outer rigid layer and an inner resilient layer whose inside dimensions are less than the dimensions of the first surface of the regenerator structure whereby the reservoir is capable of forming a vacuum seal with the upper portion of the outer wall of the regenerator.

3. The apparatus of claim 2 in which the inner resilient layer of the second reservoir has a tapered cross section increasing in thickness from the bottom to the top of the reservoir wall, whereby the reservoir is capable of being substantially supported by the outer edge of the regenerator wall thereby to promote the flow of slurry composition into the outermost peripheral cells of the honeycomb structure and to promote the flow of castable ceramic composition to the outermost portions of the wall of the regenerator.

4. The apparatus of claim 1 in which the second removable gas-pervious/slurry impervious contact means comprises a first layer of a flexible porous material selected from the group of materials consisting of paper and cloth, and a second layer of perforated rigid support material in contact therewith.

5. The apparatus of claim 1 in which a sealing ring is attached to the inner edge of the opening defined by the bottom portion of the first reservoir for the castable ceramic composition, whereby the reservoir is capable of forming a vacuum seal with the lower portion of the outer wall of the regenerator.

6. The apparatus of claim 5 in which the sealing ring has a tapered cross section increasing in thickness from the upper surface to the lower surface of the bottom portion of the casting composition reservoir.

* * * * *